June 20, 1939.　　　　S. A. SNELL　　　　2,162,762
VELOCIPEDE STRUCTURE
Filed April 5, 1937
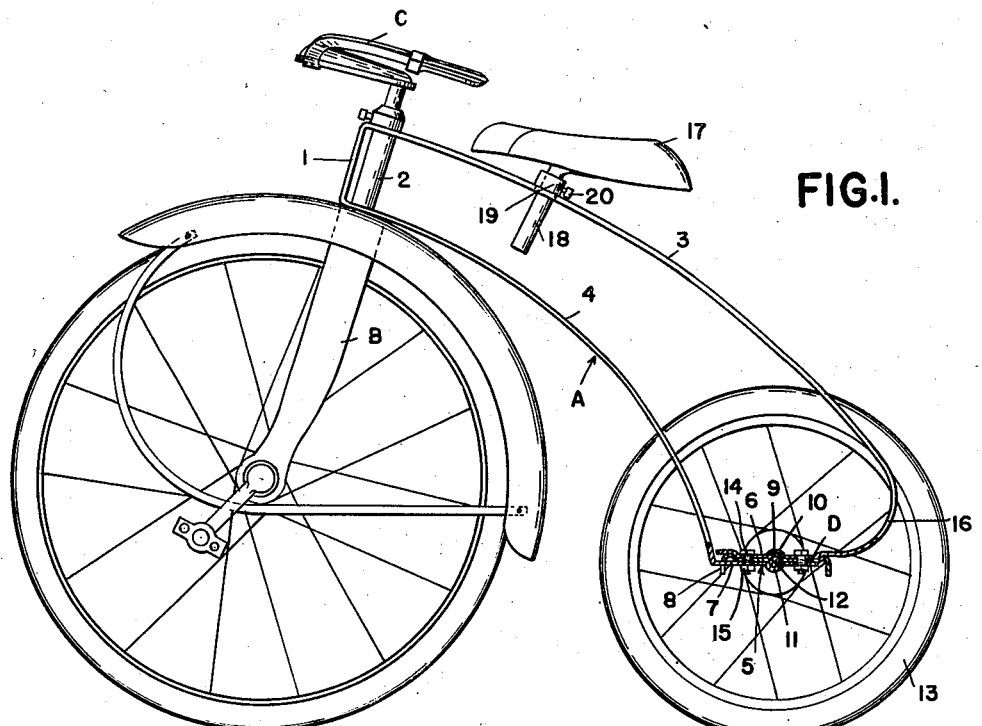
FIG.1.
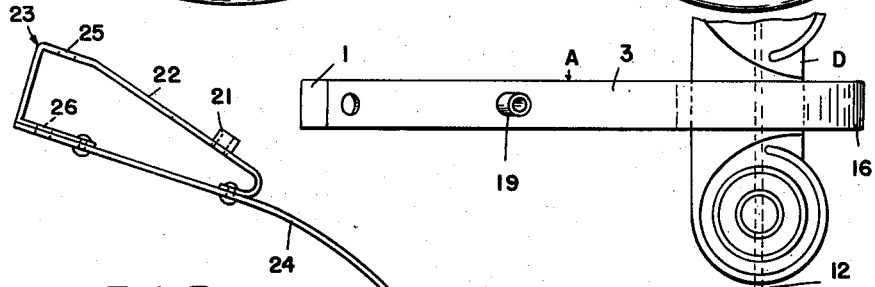
FIG.2.
FIG.3.
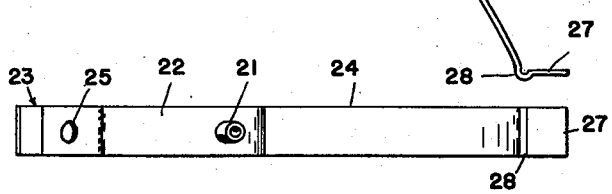
FIG.4.
INVENTOR
SAMUEL A. SNELL
BY
ATTORNEYS Patented June 20, 1939

2,162,762

UNITED STATES PATENT OFFICE 2,162,762

VELOCIPEDE STRUCTURE

Samuel A. Snell, Toledo, Ohio, assignor to The American-National Company, Toledo, Ohio, a corporation of Ohio Application April 5, 1937, Serial No. 135,156

14 Claims. (Cl. 280—283)

This invention relates generally to juvenile vehicles and refers more particularly to velocipedes.

One of the essential objects of the invention is to provide a velocipede wherein the backbone is flexible so that it will effectively cushion the rider from road shocks and jars and will materially improve the riding qualities.

Another object is to provide a velocipede that is strong and durable and that can be manufactured at a comparatively low cost.

Other objects, advantages and novel details of construction of this invention will be made more apparent as this description proceeds, especially when considered in connection with the accompanying drawing, wherein:

Figure 1 is a side elevation of a velocipede embodying my invention, with parts broken away and in section;

Figure 2 is a fragmentary top plan view of the backbone and rear platform;

Figure 3 is a side elevation of a slightly modified form of backbone;

Figure 4 is a top plan view of the structure illustrated in Figure 3.

Referring now to the drawing, A is the backbone, B is the front fork, C is the handlebar, and D is the rear platform of a velocipede embodying my invention.

As shown, the backbone A constitutes a frame member between the front fork B and rear platform D and comprises an elongated loop that is preferably formed from a single strip of spring steel. Preferably the forward end 1 of this loop is straight and is substantially parallel to the upright portion 2 of the front fork B. The upper and lower sides 3 and 4, respectively, of the loop are apertured to receive the upright portion 2 of the front fork, while the rear end 5 of the loop is formed by the overlapping end portions 6 and 7, respectively, of the strip and is secured to the rear platform D. Preferably the end portion 6 rests upon the platform D, while the end portion 7 extends through a depending flange 8 of the platform beneath the latter. As shown, the platform D and end portion 6 have arched portions 9 and 10, respectively, and the end portion 7 has a substantially U-shaped portion 11 cooperating with the arched portion 9 to receive the axle 12 for the rear wheels 13 of the velocipede. Suitable bolts 14 extend through the portions 6 and 7 and platform D and are engaged beneath the portion 7 by nuts 15 to securely hold the parts together. If desired, the bolts 14 and end portions 6 may be concealed by a suitable cap (not shown) that may be mounted on the platform D.

Except for the curved portion 16 at its rear end, the upper side 3 of the loop is somewhat straighter than the lower side 4 and forms the support for the seat 17. As shown, the post 18 of the seat engages a bushing 19 anchored in the upper side 3 of the loop and is held in place by a suitable screw 20 at one side of the bushing.

In Figures 3 and 4 I have illustrated a slight modification in which the seat bushing 21 is carried by the upper side 22 of a loop 23 on a strip 24 of spring steel. As shown, the loop 23 is located at the forward end of the strip 24 and cooperates therewith to form the backbone of a velocipede. Preferably the upper side 22 of the loop and the strip 24 have vertically aligned openings 25 and 26, respectively, for receiving an upright portion of a front fork such as B, while the strip 24 is provided at its rear end with a flat portion 27 for attachment to a rear platform such as D. At the junction of the flat portion 27 and the strip 24 is a substantially U-shaped portion 28 for receiving the rear axle such as 12 of the velocipede.

What I claim as my invention is:

1. In a velocipede, a front fork, a rear platform, an elongated closed loop formed from a single strip of spring steel constituting a frame member between said fork and platform, portions of said loop intermediate the end portions of the strip being mounted upon said fork, the end portions of said strip being in overlapping relation and disposed respectively above and below said platform, and means connecting said end portions to said platform.

2. In a velocipede, a front fork, a rear axle, a platform on the axle, and a flexible backbone mounted on the fork and having substantially flat portions above and below and secured to said platform, the portion below the platform having a substantially U-shaped portion receiving the axle.

3. In a velocipede, a front fork, a rear axle, a platform on said axle, a yieldable backbone having a portion attached to said front fork, another portion attached to said platform, and an intermediate substantially U-shaped portion for carrying said axle.

4. In a velocipede, a front fork, a rear axle, and a backbone extending between said parts and comprising a strip of spring steel bent intermediate its ends and having overlapping ends, portions of said strip near said bend being apertured to receive a portion of said fork, a platform crossing said overlapping ends, and means securing said platform and overlapping ends to said rear axle.

5. In a velocipede, a front fork, a rear axle, and a backbone extending between said parts and comprising a strip of spring steel bent intermediate its ends and having overlapping ends, portions of said strip near said bend being apertured to receive a portion of said fork, a platform extending between said overlapping ends, and a rigid connection between said platform, overlapping ends and rear axle.

6. A velocipede having a backbone comprising a closed elongated loop having overlapping portions at one end, and a platform between and clamped to said overlapping portions.

7. A velocipede having a backbone comprising a closed elongated loop having overlapping portions at one end, and an axle and a platform between and clamped to said overlapping portions.

8. In a velocipede, a front fork, a rear axle, an elongated closed loop connected at opposite ends to and constituting a backbone between said fork and axle, said loop comprising a single strip of spring steel having overlapping end portions at the rear end of said loop, and a stamping connected to said overlapping end portions and providing a platform at the rear end of said closed loop.

9. A velocipede having a backbone comprising a closed elongated loop, said loop comprising a single strip of spring steel having overlapping end portions at the rear end of said loop, a platform crossing said overlapping end portions, and a common securing means for said overlapping end portions and platform.

10. A velocipede having a backbone comprising a closed elongated loop having overlapping portions at one end, and a platform secured to said overlapping end portions.

11. A velocipede having a backbone comprising a closed elongated loop having overlapping portions at one end, and an axle for ground wheels clamped between said overlapping portions.

12. A velocipede having a backbone comprising a closed elongated loop having overlapping portions at one end, and an axle for ground wheels secured to said overlapping portions.

13. A velocipede having a backbone comprising a closed elongated loop having overlapping portions at one end, and a platform and an axle for ground wheels secured in superposed relation to said overlapping portions.

14. A velocipede having a backbone comprising a closed elongated loop having overlapping portions at one end, a platform and an axle arranged in superposed relation with said overlapping portions, and a common securing means for said overlapping portions, platform and axle.

SAMUEL A. SNELL.